United States Patent [19]
Stam et al.

[11] Patent Number: 5,837,994
[45] Date of Patent: Nov. 17, 1998

[54] CONTROL SYSTEM TO AUTOMATICALLY DIM VEHICLE HEAD LAMPS

[75] Inventors: Joseph Scott Stam; Jon Harold Bechtel, both of Holland; John King Roberts, East Grand Rapids, all of Mich.

[73] Assignee: Gentex Corporation, Zeeland, Mich.

[21] Appl. No.: 831,232

[22] Filed: Apr. 2, 1997

[51] Int. Cl.⁶ .............................. B60Q 1/115; B60Q 1/14; H05B 37/00

[52] U.S. Cl. .................. 250/208.1; 250/214 D; 250/214 AL; 315/82; 362/61

[58] Field of Search .............................. 250/208.1, 208.2, 250/205, 226, 214 D, 214 AL, 216; 362/64, 61, 83.1; 315/77, 82, 83

[56] References Cited

U.S. PATENT DOCUMENTS

| | | |
|---|---|---|
| 2,632,040 | 3/1953 | Rabinow . |
| 2,827,594 | 3/1958 | Rabinow . |
| 4,862,037 | 8/1989 | Farber et al. ............................ 315/83 |
| 4,891,559 | 1/1990 | Matsumoto et al. ..................... 315/82 |
| 4,967,319 | 10/1990 | Seko ........................................ 362/61 |
| 5,124,549 | 6/1992 | Michaels et al. . |
| 5,329,206 | 7/1994 | Slotkowski et al. . |
| 5,426,294 | 6/1995 | Kobayashi et al. ..................... 250/226 |
| 5,537,003 | 7/1996 | Bechtel et al. ........................... 315/82 |
| 5,550,677 | 8/1996 | Schofield et al. ...................... 359/604 |

FOREIGN PATENT DOCUMENTS

WO 97/35743  3/1997  WIPO .

*Primary Examiner*—Edward P. Westin
*Assistant Examiner*—John R. Lee
*Attorney, Agent, or Firm*—Brian J. Rees

[57] ABSTRACT

An automatic vehicle head lamp dimming system which includes an optical system and an imaging processing system. The optical system is configured to discriminate between head lamps and tail lamps and focus the light rays from the head lamps and tail lamps on different portions of a pixel sensor array. The optical system as well as the image processing system provides for relatively increased discrimination of head lamps and tail lamps of other vehicles and also enables the high beam head lamps of the control vehicle to be controlled as a function of the distance as well as horizontal angular position of other vehicles relative to the controlled vehicle.

53 Claims, 6 Drawing Sheets

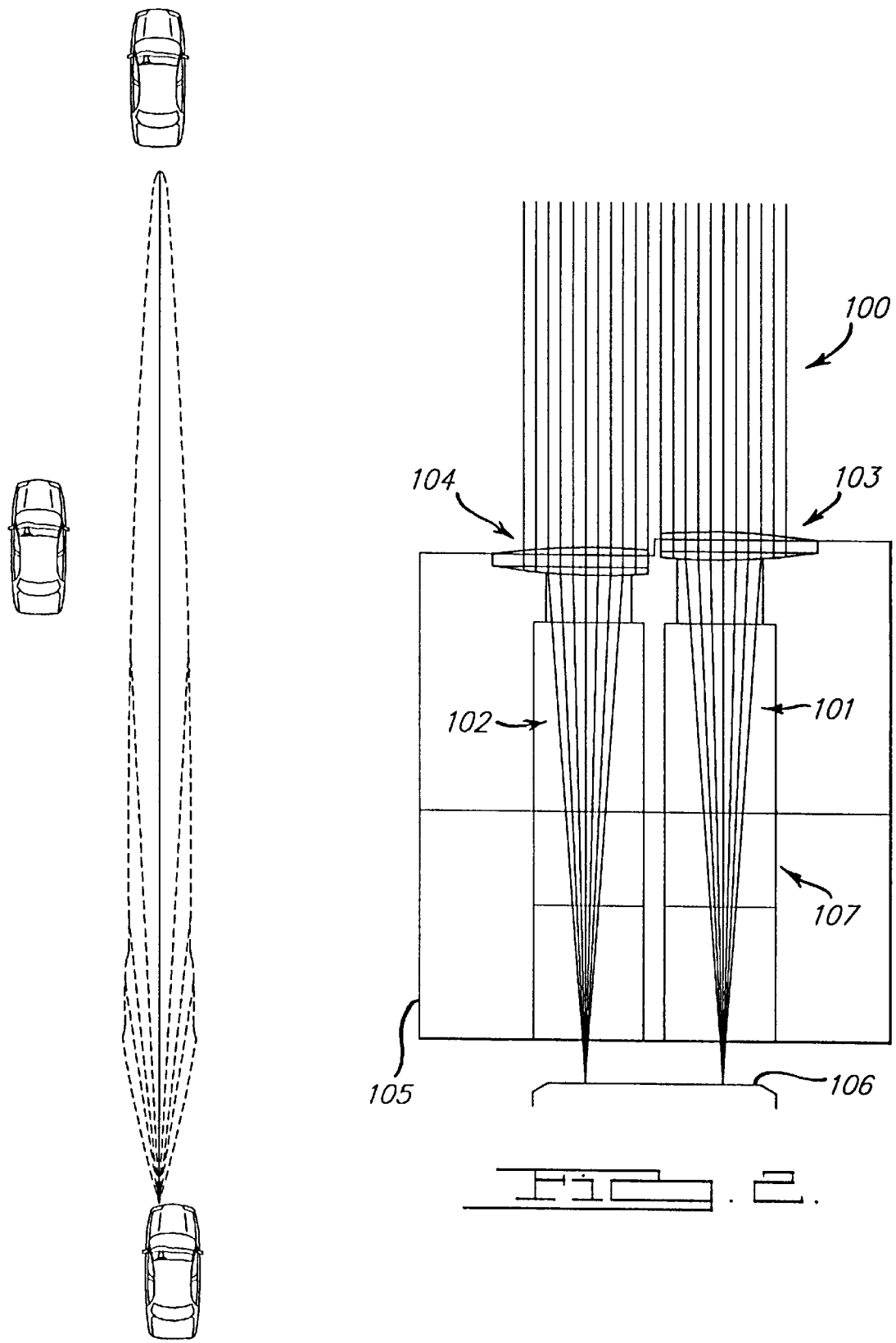

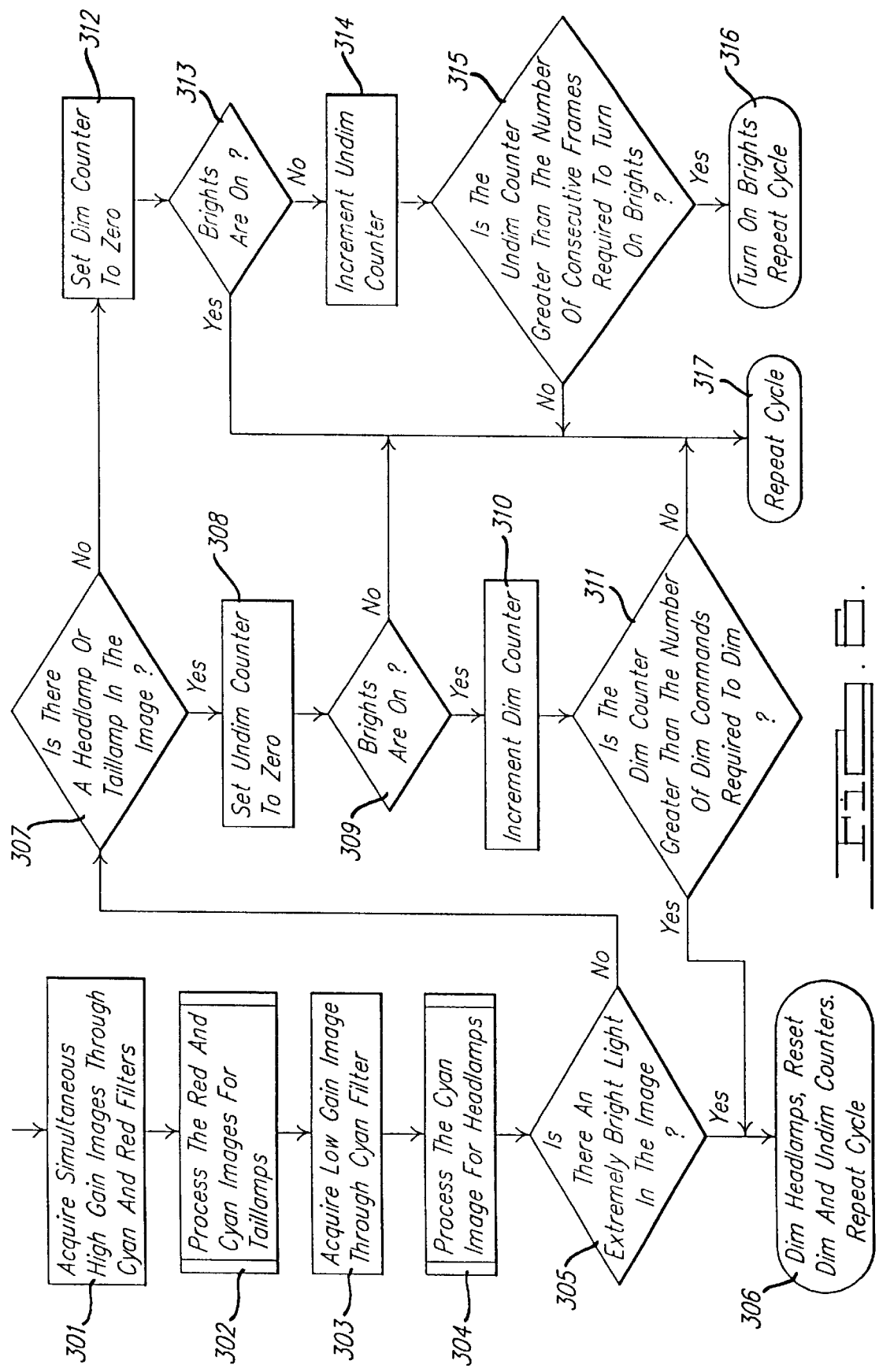

5,837,994

CONTROL SYSTEM TO AUTOMATICALLY DIM VEHICLE HEAD LAMPS

BACKGROUND OF THE INVENTION

1. Field of the Invention

The present invention relates to a system for automatically dimming vehicle high beam head lamps and more particularly to a system which includes an improved optical system and an image processing system, the optical system being adapted to discriminate both the horizontal and vertical position of light rays within a predetermined field of view and spatially segregate the light rays on a pixel sensor array in order to provide improved discrimination of vehicle head lamps and vehicle tail lamps relative to other ambient light sources. The image processing system provides further discrimination of ambient light sources in order to automatically dim vehicle head lamp high beams as a function of the angular position of another vehicle relative to the control vehicle.

2. Description of the Prior Art

Regulations set forth by the United States Department of Transportation (DOT) regulate the light emissions of vehicle high beam head lamps. Various state regulations are used to control the amount of glare experienced by drivers of other vehicles whether the vehicle is traveling in the same direction as the controlled vehicle or in an opposite direction.

Known vehicle high beam head lamp emissions in accordance with the DOT regulations provide an intensity of 40,000 cd at 0 degrees, 10,000 cd at 3 degrees, 3250 cd at 6 degrees, 1500 cd at 9 degrees and 750 cd at 12 degrees. An example of such an emission pattern is illustrated in FIG. 1. In order to avoid an illuminance of 0.5 foot candles (fc) incident on another vehicle, the vehicle high beam head lamps should be dimmed within 230 feet of another vehicle at 0 degrees, 115 feet of another vehicle at a horizontal position of 3 degrees relative to the datum, and 65 feet in the position of the other vehicle is 6 degrees relative to the controlled vehicle.

Various known head light dimmer control systems are known in the art. In order to prevent the drivers of other vehicles from being subjected to excessive glare levels, such automatic head lamp dimmer systems must sense both the head lights as well as the tail lights of other vehicles. While many known systems are adequately able to detect head lamps of oncoming vehicles, such systems are known to inadequately sense tail lights of vehicles traveling ahead of the control vehicle. As such, such systems are not able to automatically dim the high beam head lamps in time to prevent drivers of the vehicles travelling in the same direction as the controlled vehicle being subjected to excessive glare levels.

U.S. Pat. No. 5,537,003 assigned to the same assignee of the present invention discloses an automatic head lamp dimming system which includes an optical system for sensing tail lamps as well as head lamps. The '003 patent discloses a single photo diode with a mechanical scanning arrangement for scanning a predetermined field of view. Although the system provides relatively suitable sensing of head lamps as well as tail lamps, the optical subsystem is rather complicated and expensive to manufacture.

SUMMARY OF THE INVENTION

It is an object of the present invention to solve various problems in the prior art.

It is yet another object of the present invention to provide a vehicle head lamp dimming system which eliminates the need for mechanical optical scanning systems.

It is yet another object of the present invention to provide a head lamp dimming system that is adapted to dim the high beam head lights at different distances as a function of the horizontal angular position of another vehicle relative to the controlled vehicle.

Briefly, the present invention relates to an automatic vehicle head lamp dimming system. The system includes an optical system and an imaging processing system. The optical system is configured to discriminate between head lamps and tail lamps and focus the light rays from the head lamps and tail lamps on different portions of a pixel sensor array. The optical system as well as the image processing system provides for relatively increased discrimination of head lamps and tail lamps of other vehicles and also enables the high beam head lamps of the control vehicle to be controlled as a function of the distance as well as horizontal angular position of other vehicles relative to the controlled vehicle.

BRIEF DESCRIPTION OF THE DRAWING

These and other objects of the present invention will be readily understood with reference to the following specification and attached drawing, wherein:

FIG. 1 is a top view illustrating the head lamp emission pattern of a conventional high beam head lamp.

FIG. 2 is a side cross sectional view of the optical system which forms a part of the present invention illustrating light rays incident at a vertical angle within the desired field of view.

FIG. 5 is a block diagram of the automatic head light dimming system in accordance with the present invention.

FIG. 8 is a flow diagram for detecting head lamps from other vehicles within the desired field of view.

DETAILED DESCRIPTION OF THE INVENTION

Figures 3, 4:
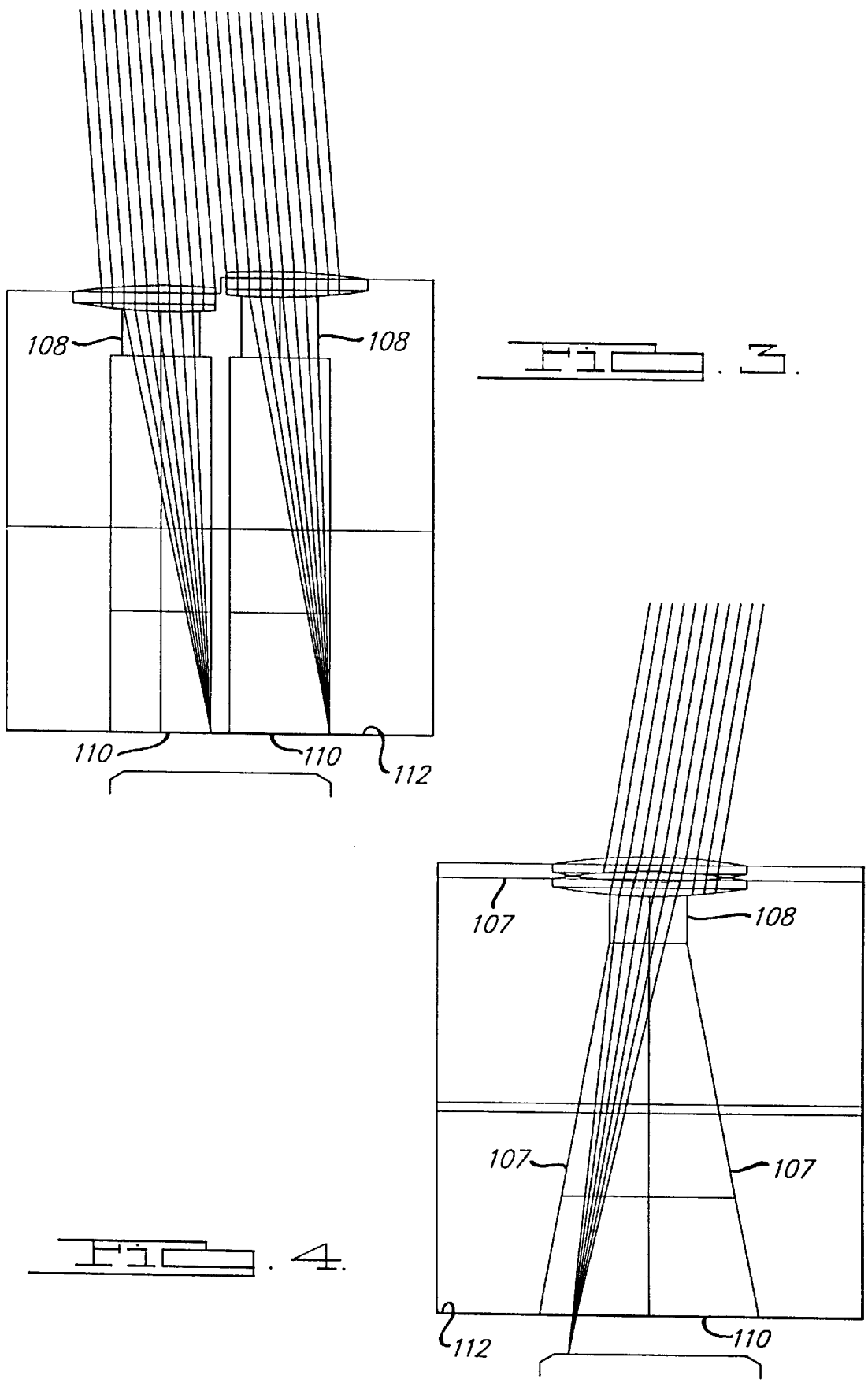
FIG. 3 is similar to FIG. 2 illustrating the light rays incident at a vertical elevation angle beyond the desired field of view.
FIG. 4 is a top cross sectional view of the optical system illustrated in FIG. 1 illustrating the light rays at a horizontal angle within the desired field of view.
Figure 3:
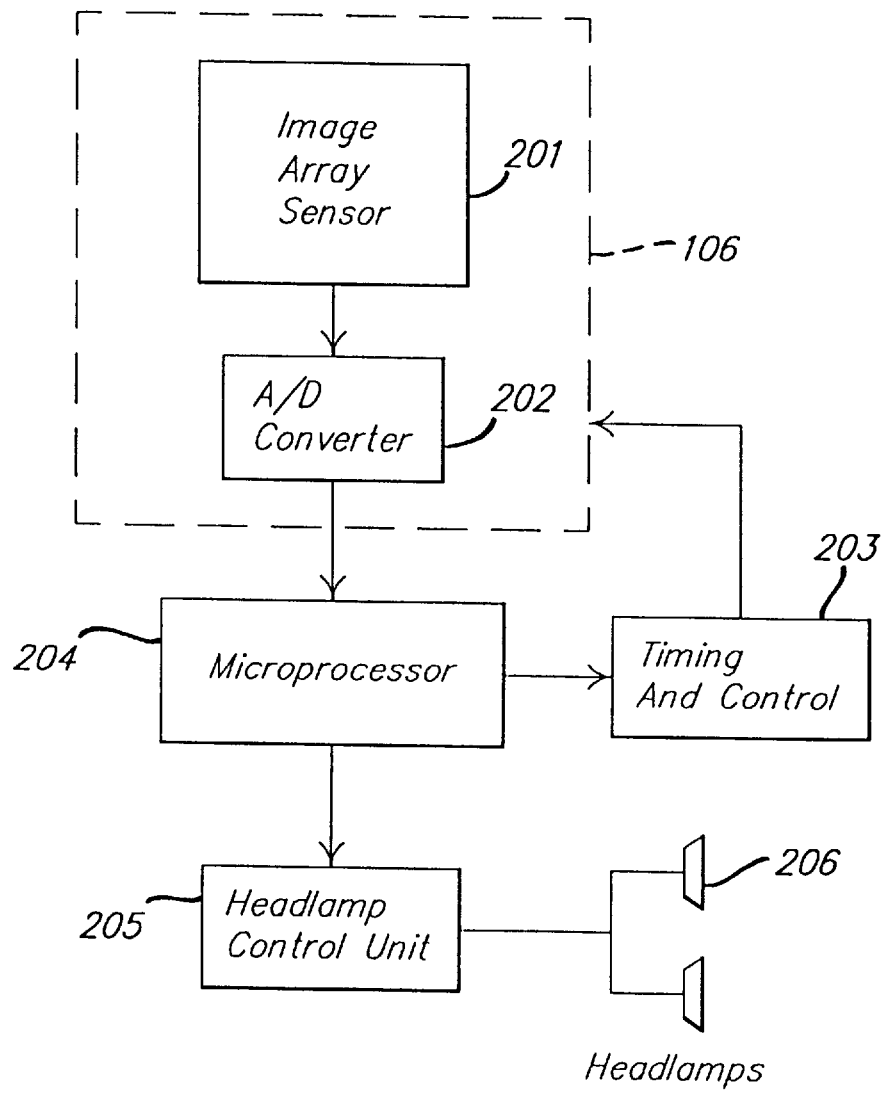

The automatic head lamp dimming system in accordance with the present invention includes an optical system as illustrated in FIGS. 2–4 and an image processing system as illustrated in FIGS. 5–8. In order to enable the high beam head lamps to remain on for the longest reasonable time without the subjecting the driver of another vehicle to excessive glare, the automatic head lamp dimming system in accordance with the present invention controls the vehicle high beam head lamps as a function of the distance as well as the horizontal angular position of the other vehicle relative to the controlled vehicle. As will be discussed in more detail below, the optical system is adapted to discriminate between head lamps and tail lamps of other vehicles. The light rays from the head lamps and tail lamps of other vehicles are spatially segregated on a pixel sensor array to provide increased discrimination of head lamps and tail lamps relative to other ambient light sources, such as road signs and reflections from snow and the like. The optical system enables both the horizontal and vertical position of incident lights sources to be determined within the field of view of the optical system. The image processing system processes the pixels to provide for automatic control of the head lamps as a function of the distance and horizontal angular position of another vehicle relative to the control vehicle. As such, the system in accordance with the present invention is adapted to provide optimal control of the vehicle high beam head lamps by allowing the high beam head lamps to remain on for as long as possible while preventing the driver of the other vehicle from being subjected to an undue amount of glare.

OPTICAL SYSTEM

Referring to FIGS. 2–4, the optical system includes a pair of lenses 103 and 104, a lens holder 105 and an image array sensor 106. As best shown in FIGS. 2 and 3, the lenses 103 and 104 are vertically spaced apart in order to allow imaging of substantially the same field of view onto different portions of the substantially array. The lenses 103, 104 image generally the same fields of view because the distance between the lenses 103, 104 is relatively small relative to the light sources within the field of view of the device.

The lens 103 may be formed with a red filter dye for transmitting light with wavelengths less than 600 nm and focusing red light rays 101 from tail lamps onto one half of the image array sensor 106. The red filter dye causes the lens 103 the absorb all light rays at the blue end of the visible spectrum and transmit light rays at the red end of the spectrum. As such, the amount of light transmitted from non-red light sources, such as head lamps, is greatly reduced while light rays from tail lamps are fully transmitted through the lens 103. As such, the relative brightness of the light rays from tail lamps imaged onto the image array sensor 106 is greatly increased.

The lens 104 may be formed with a cyan filtered dye for transmitting light with wavelengths greater than 600 nm. The lens 104 is used to focus the light rays onto the other half of the image array sensor 106. The cyan filter dye has a complementary effect to the red filter described above. In particular, the red filter dye absorbs light from the blue end of the visible spectrum while transmitting light from the red end of the spectrum. As such, most of the light from sources, such as head lights, are transmitted through the lens 104 while virtually all of the light emanating from tail lamps is blocked.

Both head lamps and tail lamps emit a substantial amount of infrared light. By utilizing lenses with a filter dye or separate filters which inhibit light at wavelengths greater about 750 nm, the infrared light transmitted by the head lamps and tail lamps will be substantially blocked by the lenses 103 and 104. By eliminating infrared light, the ratio between intensity between red lights imaged through the red filter and red light imaged through the cyan filter will be substantially increased.

The use of the red and cyan dyes for the lenses 103 and 104 is merely exemplary. The filter characteristics of the lenses 103 and 104 are selected to optimize the sensitivity of the device to specific light sources. For example, if the head lamps or tail lamps in new vehicles may be replaced with alternative light sources with different spectral composition, for example, with high intensity discharge head lamps and light emitting diode tail lamps requiring different filter characteristics. Depending on the spectral characteristics of the head lamps and tail lamps, transparent lenses 103 and 104 may be utilized with separate color filters.

The lenses 103 and 104 may be formed as acrylic spherical lenses. Alternatively, the lenses 103 and 104 may be formed as a spherical lenses in order to minimize color dispersion and spherical aberration present with spherical lenses. Complex lenses formed from both spherical and a spherical lenses are also contemplated.

A single lens may also be used in place of the separate lenses 103 and 104. The use of a single lens may be used to image the field of view onto a full or partial color image array sensor containing pigmentation on the individual pixels in the array.

As shown best in FIGS. 2 and 3, the horizontal distance between the two lenses 103 and 104 and the image array sensor 106 is slightly different. Offsetting of the two lenses 103 and 104 compensates for the color dispersion created as a result of the fact that the index of refraction of materials varies with the wavelength of light transmitted through it. Because the two lenses 103 and 104 transmit different portions of the visible spectrum, the distance between the lenses 103 and 104 and the image array sensor, 106 is optimized to minimize the dispersion for the band of light transmitted by each of the lenses 103 and 104.

As mentioned above, the light rays 101 transmitted through the lens 103 are imaged onto one-half of the image array sensor 106 while the light rays 102 transmitted through the lens 104 are imaged onto the other half of the image array sensor 106. In order to provide such spatial segregation of the light rays transmitted through the lenses 103 and 104, the lens holder 105 is provided with cutouts 107 and preferably formed or coated with a light absorbing material. These cutouts 107 prevent light rays beyond the desired maximum vertical angle transmitted through the red lens 103 from being imaged onto the portion of the image array sensor 106 reserved for the light rays 102. Conversely, the cutouts 107 also prevent light rays transmitted through the lens 104 from being imaged onto the portion of the image array sensor 106 reserved for the light rays 101.

The field of view of the optical system is defined by the configuration of the lenses 103 and 104 and the cutouts 107 relative to the image array sensor 106. For example, an exemplary field of view of 10 degrees in the vertical direction and 20 degrees in the horizontal directions may be created by the configuration set forth below. In particular, for such a field of view, the lenses 103 and 104 are selected with a diameter of 1.5 mm with a small portion cut away to allow the lenses 103, 104 to be positioned such that their centers are separated by 1.0 mm. The lens 103 is positioned 4.15 mm from the image array sensor 106 while the lens 104 is positioned 4.05 mm away. Both the front and rear surface radii of the lenses 103 and 104 are 4.3 millimeters with a 0.2 millimeter thickness.

As best shown in FIGS. 3 and 4, circular cutouts 108 are formed in the lens holder 105. A pair of generally rectangular apertures 110 are formed in a rear wall 112. The rear apertures 110 are 1.6 millimeters in the horizontal direction and 0.8 millimeters in the vertical direction. As best shown, in FIG.4, the cutouts 107 taper from the rear apertures 110 to the diameter of the front cutouts 108 to provide the field of view discussed above.

The configuration described above is thus able to baffle light outside of the desired horizontal and vertical field of view. In particular, FIG. 3 illustrates how the system baffles light rays incident at angles beyond the vertical field of view. FIG. 4 illustrates light rays being imaged onto the image array sensor 106 within the horizontal field of view.

The image array sensor 106 may be CMOS active pixel image sensor array for example, as disclosed in U.S. Pat. No.

5,471,515, hereby incorporated by reference and available from Photobit LLC of La Crasenta, Calif. CMOS active pixel image sensors provide relatively high sensitivity and low power consumption as well as the ability the integrate other CMOS electronics on the same chip. The image array sensor 106 may be a 50×50 40μm pixel array. The number of pixels in the image array sensor 106 is selected such that not all pixels fall within the area that the lenses 103 and 104 project onto. The extra pixels allow for simple correction for mechanical misalignment by offsetting the expected image location.

The image array sensor 106 provides spatial information regarding light sources within the field of view. The number of pixels present in the array is selected to obtain sufficient spatial detail although the size of the array is not limited and may be selected and may even be dictated by physical and economic limitations.

The image array sensor 106 must be sensitive to accurately detect tail lights at several hundred feet. Such sensitivity may be achieved by lengthening the amount of time the photosites in the array are exposed to light during a frame period. A frame period is selected to enable the array to capture and transfer a frame to the image processing system in a short enough time to allow the image processing system to detect another vehicle entering the field of view. A short time period also limits the amount of motion within a frame during the integration period and thus produces a relatively more accurate instantaneous image.

The use of a pixel array also provides other benefits. For example, as mentioned above, the light integration time to capture a frame can be varied. Such a feature, allows the system to provide optimal results in varying degrees in darkness. Another important aspect of an image array sensor is the ability to utilize subsets of the pixels within the array or an individual pixel. As such, as the window size is decreased, the readout rates can be increased. Such a feature allows the system to discriminate ambient light sources, such as street lamps. In particular, such a feature allows the system to locate a light source within the frame and capture several samples of the light sources at a rate several times greater than 60 hz. In particular, if the samples exhibits 120 Hz intensity modulation, the light source is likely a street lamp or other light source powered from a 60 Hz AC power supply. If the light source is not modulated, the light source is likely powered by the vehicle's DC power supply.

Another potential benefit of the image array sensor is that it allows the field of view immediately in front of the vehicle to imaged by a higher pixel resolution. Thus, the system may be configured such that the effective pixel resolution decreases as the angle of the vehicle relative to the control vehicle increases thus reducing the amount of processing time in those areas. Such a configuration reduces the sensitivity of the device to light sources from reflective stationary objects on the side of the road.

An image array sensor could be manufactured in which the pixel pitch is varied as a function of the area in the field of view that the pixel images. For example, pixels imaging the space corresponding to horizontal angles within 3 degrees of the center of the vehicle may be provided with a 10 μm pixel pitch. Pixels imaging horizontal angles between 3 and 6 degrees may be provided with a 20 μm pixel pitch, while those imaging angles greater than 60 degrees may be provided with a 40 μm pitch. While such a configuration may not increase the sensing area, the ability the resolve detail increases; an important aspect in considering that relative size of a tail lamp at a relatively large distance. For example, a 4½ inch diameter tail light at a distance of 200 feet subtends an angle of less than 0.11 degrees. If a 50×50 image array sensor is used to image a 20 degree field of view, the tail lamp would subtend approximately 8% of the total area imaged by the pixel.

A tail lamp is relatively brighter than its ambient surroundings, however, the red light contributed by the tail light is diluted by the ambient light at such a distance. Such a factor is critical when comparing the amount the red light in a given area to the amount of non red light in the same area. When the area of space compared is large relative to the light source, the percentage of red light is diminished. By comparison, if 10 μm pixels are used in the center of the array 106 instead of 40 μm pixels, the tail lamp would subtend 0.04% of the total areas, an improvement of 16 times.

IMAGE PROCESSING SYSTEM

The image processing is illustrated in FIGS. 5–8. The image processing system includes the image array sensor 106, a microprocessor 204, for example, a Motorola type MC68HC08XL36, a head lamp control unit 205 and a pair of head lamps 206. As mentioned above, an active pixel array sensor may be utilized for the image array sensor 106. Such an active pixel array sensor includes an image array 201 and an analog to digital converter (ADC) 202. A timing and control circuit is used to control the image array 201 as well as the ADC 202 to control the integration time, read out timing, pixel selection, gain offset and other variables. The microprocessor 204 is used to analyze the data collected by the image array sensor 201. The microprocessor 204 is in communication with the head lamp control unit, a conventional unit, implemented, for example, as a relay, which, in turn, controls the head lamps 206. The head lamp control unit 205 in turn, changes the voltage applied to the head lamp 206 to cause the high beam or bright lamp to be switched on or off.

Figure 6:
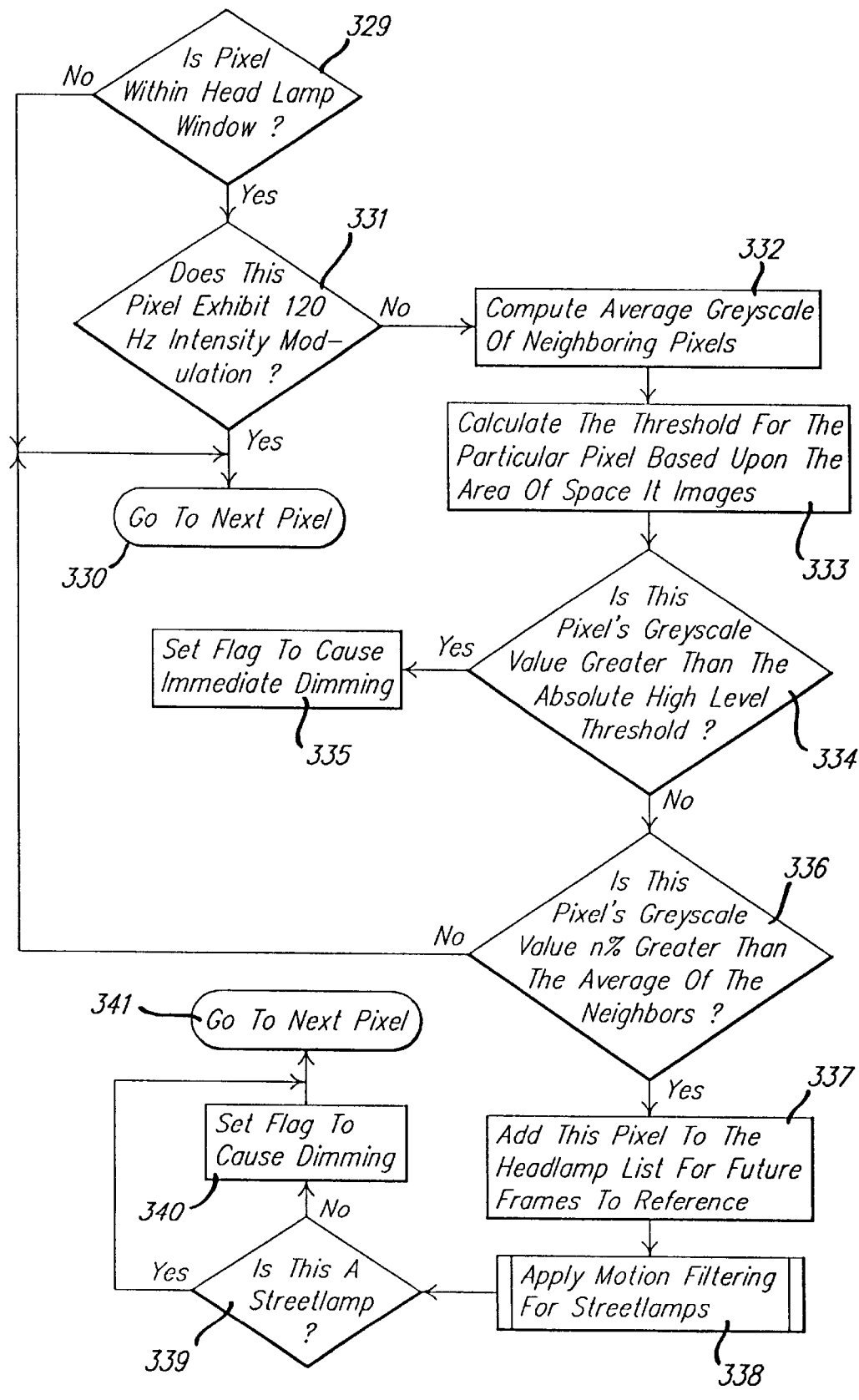
FIG. 6 is an overall flow diagram of the image processing in accordance with the present invention.

The flow chart for the head lamp control is illustrated in FIG. 6. The system runs in a continuous cycle with occasional interrupts for absolute light measurements, adjustments of ADC parameters or other functions.

At the beginning of each cycle, two images are acquired through the lenses 103 and 104. In step 302, the images from the lenses 103 and 104 are analyzed to detect tail lamps. Another image is acquired in step 303 through the lens 104. The image acquired through the lens 104 is acquired with a low enough gain to detect oncoming head lights while rejecting lower light level reflections and nuisance light sources. After the images are analyzed, the system checks for very bright lights in the image indicating the sudden appearance of vehicle head lamps or tail lamps within the field of view, as is the case, when a car turns in front of the controlled vehicle in step 305. If bright lights are sensed, the device dims the head lamps 206 immediately and bypasses the time verification as discussed below. The cycle is then repeated. If there were no bright lights, the system proceeds to step 307 to determine if there are any head lamps or tail lamps in the image.

In order to confirm the presence or lack of presence of a head lamp or tail lamp in a frame, an undim counter and a dim counter are used. These counters provide verification of a particular light source whether from a tail lamp or head lamp from consecutive frames before signaling the head lamp control unit 205 to dim or undim the head lamps 206, except as described above, when a bright light is detected. By providing verification, anomalies within the device or in the image will not cause spurious operation of the head lamps 206.

The dim counter is incremented each time a frame with a head lamp or tail lamp is detected until the number of required consecutive frames to take action is reached. The dim counter is set to 0 each time a clear frame is processed. The undim counter is incremented with each clear frame and set to 0 with each frame containing a head lamp or tail lamp. The actual number of consecutive frames required to dim or undim is determined by the overall speed of the device. The more frames used for verification, the less susceptible the system will be to noise and anomalies. However, the device must be able to react quickly to be effective so the number of verification frames is kept relatively low. Whenever a head lamp or tail lamp is detected in step 307, the undim counter is set to 0 in step 308. In step 309, the system checks whether the head lamp 206 high beams are on. If the high beams are off, no further action is required and the cycle is repeated as indicated by step 317. If the high beams are on, the dim counter is incremented in step 310. After the dim counter is incremented in step 310, the system checks in step 311, if the dim counter has reached the number of consecutive frames required to dim the head lamps 206. If so, the system proceeds to step 306 and dims the head lamps 206 and resets both the dim and undim counters and repeats the cycle. Otherwise, the system repeats the cycle and proceeds to step to 317.

In step 307, if there are no head lamps or tail lamps in the image, the dim counter is set to 0 in step 312. Subsequently, in step 313, the system determines whether the high beams 206 are on. If the high beams are on, the system exits repeats the cycle in step 317. In step 313 if the brights are not on, the undim counter is incremented. After the undim counter is incremented, the system checks in step 315 whether the undim counter has reached the number of consecutive clear frames required to activate the high beams 206. If so, the high beams are turned on in step 316, and the cycle is repeated. If the undim counter is less than the required number for activating the bright head lamps 206, the system repeats the cycle in step 317.

Figure 7:
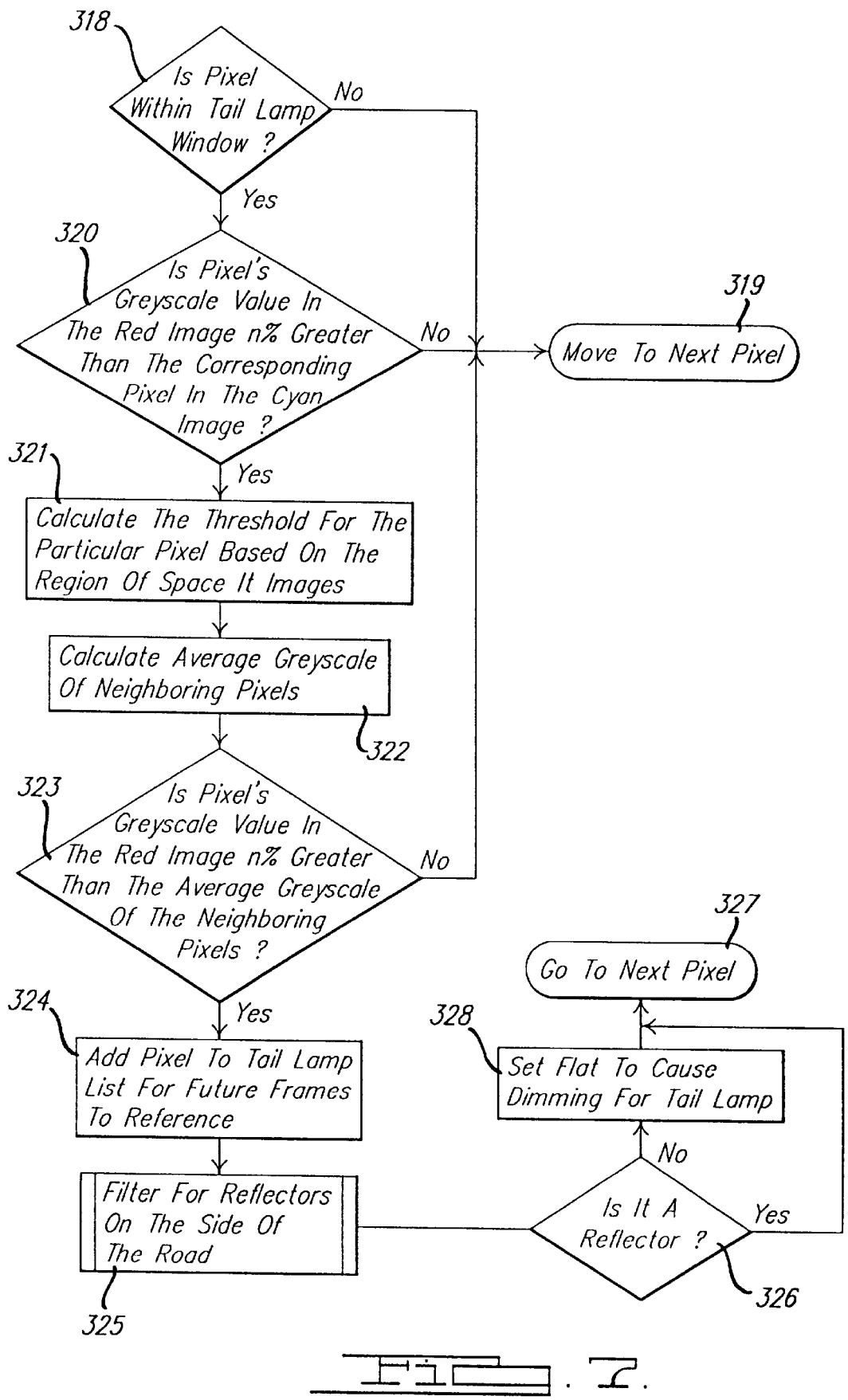
FIG. 7 is a flow diagram illustrating the method for detecting tail lamps of vehicles within the desired field of view.

The flow diagram for tail light processing is illustrated in FIG. 7. As will be discussed in more detail below, the primary method of identifying an object such as a tail light, involves comparing the gray scale value of a pixel through the lens 103 to a gray scale value of the pixel representing the same space imaged through the lens, 104. If the value of the pixel imaged through the lens 103 is significantly higher than the value of the pixel imaged through the lens 104, the light source is determined to be red light. In addition to determining if the light is red, the system also checks the brightness of the red light before deciding that the light is a tail lamp by determining if the gray scale value of the pixel is greater than a threshold value. As is known in the art, the brightness of a light source varies with the square of the distance of the light source from the observer. As such, an approximate determination of the distance of a leading vehicle can be made to determine the appropriate time to dim the head lamps.

The threshold value may be computed in a variety of ways. For example, it can be a predetermined fixed number or a number that is a function of the current image sensor and ADC settings. The threshold value can also be determined by computing a threshold as a factor of the average pixel intensity of the entire image which would help eliminate variances caused by changing ambient light sources. In addition, the pixel value may be compared to the average of the pixels in the immediate area of the pixel of interest. This local average method prevents relatively large, moderately bright spots in the image from being seen as vehicle light sources. More particularly, distant tail lamps subtend less than one pixel and thus will only have moderate brightness. Large spots in the image with moderate brightness are most likely caused by reflections from large objects. Close tail lamps which subtend many pixels will have a saturated center which will be brighter than the surrounding pixels allowing the same method to detect them as well.

The threshold may also be determined by varying the threshold spatially by way of a look up table or computation. However, the threshold should be determined so that dimming occurs appropriately for the dimmest tail lights allowed by the DOT standards. Distant vehicles are subjected to the most intense portion of the controlled vehicle high beam, thus requiring dimming only directly in front of the controlled vehicle as indicated in FIG. 1. Thus, a relatively low threshold may be selected for light sources imaged directly in front of the control vehicle while a higher threshold for light sources that are not directly in front of the control vehicle. For example, as discussed in connection with FIG. 1, the threshold for pixels imaging the field of view 3 degrees, right and left of the center should correspond to a light level incident on the image array sensor 106 about 4 times as bright as the threshold for red light directly in front of the vehicle and 12 times as bright for vehicles at 6 degrees. Such a spatially varying threshold helps eliminate false tail lamp detection caused by red reflectors by making the system less sensitive to areas of to the sides of the control vehicle.

A similar approach can be taken for varying the threshold for pixels in imaging areas of space and angles above and below the center. However, a more conservative approach can be taken when determining the tail light sensitivity relative to the vertical angle since vehicles tend to move more frequently and rapidly in vertical directions due to hills, and bumps in the road. Therefore by specifying relatively tight vertical thresholds may cause the bright head lamps 206 to switch on and off as the vehicle moves several degrees up and down.

A hysteresis multiplier may be applied to the threshold to prevent oscillations of the head lamps 206 when the light source has a gray scale value at or near the threshold. Thus, if the bright head lamps 206 are off, the threshold will be lower for all pixels to prevent the bright head lamps from coming back on even if the faintest tail lamps are present in the image. However, if the bright head lamps 206 are on, the threshold should be higher so that only tail lamps of sufficient brightness are sensed to indicate that the car is within the dimming range to cause the head lamps 206 to dim.

One of the biggest problems facing the detection of the tail lamps is the nuisance red light reflected from corner cube reflectors commonly found as markers on the side of the road and on mail boxes. The variable threshold method mentioned above helps eliminate some of this noise. However, when a vehicle approaches a reflector at the proper angles, it is relatively impossible to distinguish a red reflector from a tail lamp. Fortunately, by examining successive frames and investigating the motion of these objects over time, such reflections can be filtered. By storing the location of the tail lamps and images over time or by sensing small region of interest where the tail lamp is located, several consecutive times, the device can look for rightward motion and determine if the light source is a reflector. Additionally, the speed at which the control vehicle overtakes a stationary object is much greater than the relative rate a vehicle would overtake another moving vehicle. Thus, the rate of increase in brightness of the object would be typically much greater for a stationary reflector than for another vehicle. This rate of change in brightness coupled with rightward horizontal motion can be used as signatures to reduce the number of false tail lamps detected.

A computationally simpler method of analyzing spatial motion of a light source is to simply take several consecutive regions of the local region of interest where the light source is located. Motion in the vertical and horizontal directions is relatively slow for tail lamps of a leading vehicle. Simply sampling a pixel a few consecutive times to see if the tail lamp is present in all samples can adequately eliminate objects which rapidly move within the image.

The flow diagram for tail lamp processing is illustrated in FIG. 7. Initially, in step 318, the system ascertains if the pixel is within the tail lamp window. In particular, as mentioned above, red lights are imaged onto half of the image array sensor 106. Thus, if the pixel is not within the appropriate half of the image array sensor 106, the system proceeds to step 319 and moves to another pixel. As mentioned above, there are two criteria for ascertaining whether the image is a tail lamp. The first criteria relates to comparing the gray scale value of the pixel image through the lens 103 with a corresponding gray scale value for the same area in space imaged through the lens 104. If the gray scale value of the pixel imaged through the lens 103 is significantly larger than the gray scale value of the corresponding pixel imaged through the lens 104, one of the criteria for detecting a tail lamp, is met. Thus, if the pixel of interest is within the tail lamp window as ascertained in step 318, the gray scale value of the pixel imaged through the lens 103 is compared with the gray scale value of a corresponding pixel imaged through the lens 104 in step 320. If the gray scale value of the pixel image through the lens 103 is not n% greater than the corresponding pixel imaged by the lens 104 the system proceeds to step 319 and examines another pixel. Otherwise, the system proceeds to step 321 and calculates the threshold for the particular pixel based on the region of space it images. For example, as discussed above, the pixel thresholds may be varied based on their spatial relationship within the image array sensor.

As discussed above, the other criteria for tail lamp detection relates to the relative brightness of the pixel relative to neighboring pixels. Thus, in step 322, the system calculates the average gray scale value of neighboring pixels. If it is determined in step 323 that the pixel gray scale value for the pixel imaged through the lens 103 is n% greater than the average gray scale value of the neighboring pixels, the system proceeds to step 324 and adds the pixel to the tail lamp list for future frames of reference. Otherwise, the system moves to step 319 and moves the next pixel. In steps 325 and 326, the systems determines whether or not the red light detected is a tail lamp or a reflector, as discussed above. If it is determined that the light is a reflector, the system proceeds to step 327 and moves on to the next pixel. Otherwise, the head lamps are dimmed in step 328.

The flow diagram for head light processing is illustrated in FIG. 8. Head lamp detection is similar to tail lamp detection. The primary difference is that only the lens 104 is utilized. As mentioned above, the pixel integration time is shorter and the ADC parameters are such that the image only shows very bright objects, such as head lamps. Most reflections have low intensity light sources which fall well below the zero threshold of the ADC. As such, pixels are compared to the local average intensity of the neighboring pixels. Spatial variances in the thresholds may be set so that pixels corresponding to the center of the field of view are more sensitive pixels to the left of the image (left hand drive countries) have higher thresholds. These thresholds, however, should not vary spatially to the same degree as the threshold for the tail lamps because of the relatively wide variance in the emission patterns observed from head lamps. In addition, due to the relatively higher potential for more glare to the driver of an oncoming car, the head lamps may be controlled and dimmed relatively more rapidly than in the case when a tail lamp from a vehicle traveling in the same direction is detected. Similar to the tail lamp processing circuit hysteresis may be added to prevent cycling of the head lamps.

An additional concern with head lamp detection arises from the rapid decrease in distance between oncoming vehicles which becomes especially critical when an oncoming vehicle suddenly enters the controlled vehicle's field of view, for example, when turning a corner or in a similar situation. For this reason, additional flag is used to cause the vehicle to immediately dim the bright head lamps and bypass any verification if the light source is above certain absolute high level brightness threshold.

The primary nuisance light source complicating head lamp detection comes from overhead lights, such as street lights and electrically illuminated street signs. One method of eliminating such nuisance light sources is to analyze their motion. In particular, all overhead street lamps will move vertically upwards in the image as the controlled vehicle is moving. Analyzing this motion provides an efficient method of detecting some street lamps. Unfortunately, distant street lamps appear to be at almost the same elevational angles as distant head lights and the rate of vertical climb in the image does not become great until the street lamp is closer. However, as discussed above, street lighting is AC controlled and thus is subject to 120 Hz intensity modulation. Head lamps powered by DC source do not exhibit this characteristic. Thus, the image array sensor 106 is able to utilize small number of pixels that for taking several rapid consecutive readings in a window. If the window is small enough, the window can read several hundred frames per second. Once the light source is identified in the image, several frames are read out at a rate of 240 Hz or higher. These readings are then analyzed to detect the intensity modulation. If modulation is present, the light source originates from an AC source and can be ignored. Alternatively, a photodiode can used in conjunction with a low pass filter to determine the ratio of light in the image that was AC modulated to the unmodulated light. If a significant portion of the light source is AC modulated, the light source present in the image is assumed to be from AC light. Otherwise, the light source is assumed to be from a DC source.

The flow diagram for head lamp processing is illustrated in FIG. 8. Initially, the system determines in step 329 whether the pixel is in the head lamp window (i.e. that portion the image array sensor 106 reserved for light arrays imaged through the lens 104). If not, the system proceeds to step 330 and examines the next pixel. Otherwise, the system examines the pixel in step 331 to determine if the pixel is modulated at 120 Hz as discussed above. If so, the light source is assumed to be a street lamp and thus, the system proceeds to the next pixel in step 330. If the pixel is not subject to 120 Hz intensity modulation, the system then computes the average gray scale of neighboring pixels in step 332. In step 333, the system determines the threshold for the particular pixel based on the area of the space it images. The system, next compares the gray scale value of the pixel with an absolute high level threshold in step 334, for example, to determine if any oncoming cars suddenly come into the field of view of the controlled vehicle. If so, the system proceeds to step 335 and sets a flag to cause immediate dimming. Otherwise, the system proceeds to step 336 and determines if the gray scale value of the pixel is n% greater than the average of neighboring pixels. If not, the system returns to step 330 and examines the next pixel. Otherwise, the system proceeds to step 337 and adds the pixel to the head lamp list for future frames to reference.

As discussed above, the system examines light sources as discussed above in steps 338 and 339 to determine if the light source is a street lamp. If the system determines that the light source is not a street lamp, the system proceeds to step 340 and sets a flag to cause dimming of the head lamps 206. If the system determines that the light source is a street lamp, the system proceeds to step 341 and moves on to the next pixel. Traditional vehicle lamps systems have the option of the bright lamps being either on or off. The present invention is readily adaptable for use with a head lamp system where the brights can be activated to a varying the brightness based on the distance of other vehicles in the field of view. In such an embodiment, the brightness of the head lamps may be varied by various techniques including modulating the duty cycle of the head lamp in order to reduce or increase the overall brightness level.

Variable intensity head lamps also result in better noise filtration. In particular, whenever a light source is detected which causes the brightness of the controlled head lamps of the vehicles to be decreased other images can be detected to determine if the intensity of these other light sources decreases by a similar amount. If so, the system would be able to determine that the light source is a reflection from the vehicle's head lamps. Such information can be used as feedback to provide a relatively efficient means for eliminating nuisance light caused by reflections of the control vehicle head lamps. In such an embodiment, the brightness threshold discussed above, would not be used. More particularly, the brightness of the brightest head lamp and tail lamp in the images is used to determine the brightness of the controlled vehicle's head lamps. The brighter the head lamps or tail lamp in the images, the dimmer the controlled head lamps.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A control system for automatically controlling the state of the head lamps of a controlled vehicle, said control system comprising:
   an optical system for imaging external sources of light within a predetermined field of view; and
   an image processing system for processing images from said optical system and providing a control signal for controlling the state of the head lamps as a function of the relative output of pixels imaging the same spectral band of light.

2. The control system as recited in claim 1, wherein said optical system is configured to image light sources over a predetermined horizontal and vertical range defining said predetermined field of view.

3. The control system as recited in claim 2, wherein said optical system is fixed relative to said controlled vehicle.

4. The control system as recited in claim 2, wherein said optical system includes an image array sensor containing a plurality of pixels.

5. The control system as recited in claim 4, wherein said pixel image array sensor is a CMOS active pixel image array sensor.

6. The control system as recited in claim 2, wherein said optical system includes means for baffling light outside said predetermined field of view.

7. The control system as recited in claim 4, wherein said optical system is further configured to spatially segregate light sources having different spectral compositions on said pixel image array sensor.

8. A control system as recited in claim 1, wherein said image processing system processes images on a frame by frame basis and examines various frames in order to detect the motion of various light sources relative to said controlled vehicle.

9. The control system as recited in claim 8, wherein said image processing system compares successive frames to detect vertical motion of said light sources relative to said controlled vehicle.

10. The control system as recited in claim 9, wherein said light sources are overhead street lamps.

11. The control system as recited in claim 10, wherein said image processing system compares successive frames to detect horizontal motion of said light sources relative to said controlled vehicle.

12. The control system as recited in claim 11, wherein said light sources are reflected lights from stationary reflectors relative to said controlled vehicle.

13. The control system as recited in claim 1, wherein said optical system includes means for filtering infrared light from said external sources of light.

14. The control system as recited in claim 1, wherein said optical system includes two or more lenses and an image array sensor.

15. The control system as recited in claim 14, wherein said two or more lenses and said array sensor are configured to image said predetermined field of view onto different portions of said image array sensor.

16. The control system as recited in claim 15, further including means for filtering the light through said two or more lenses such that one of said two or more lenses filters light below a first predetermined wavelength and another of said two or more lenses filters light above a second predetermined wavelength.

17. The control system as recited claim 16, wherein said first and second predetermined wavelengths are the same.

18. The control system as recited in claim 16, wherein one of said two or more lenses transmits light having a wavelength longer than 600 nm defining a red filter for imaging tail lights on one portion of said image array sensor.

19. The control system as recited in claim 18, wherein tail lamps are detected by comparing the relative output of a pixel imaged through the red filter with the average pixel output of a selected group of neighboring pixels imaged through the red filter and indicating a tail lamp detection when the pixel output is predetermined percentage higher than the average pixel output of said selected group of pixels.

20. The control system as recited in claim 18, wherein another one of said two or more lenses transmits light having a wavelength shorter than 600 mn defining a cyan filter for imaging headlamps on another portion of said image array sensor.

21. The control system as recited in claim 20, wherein head lamps are detected by comparing the relative output of a pixel imaged through the cyan filter with the average output of a selected group of pixels and indicating a head lamp when the pixel output is a predetermined percentage higher than the average pixel output of said selected group of pixels.

22. The control system as recited in claim 20, wherein said image processing system includes means for processing images from said optical system on a frame by frame basis.

23. The control system as recited in claim 22, wherein said image processing system includes means for detecting external headlamps in each frame.

24. The control system as recited in claim 23, wherein said image processing system includes means for detecting tail lamps in each frame.

25. The control system as recited in claim 24, wherein said image processing system includes a dim counter, which is incremented, whenever a frame is processed which contains at least one tail lamp or head lamp.

26. The control system as recited in claim 25, wherein said dim counter is reset whenever a frame containing no head lamps or tail lamps is processed.

27. The control system as recited in claim 26, wherein said control signal is generated as a function of the value of the dim counter.

28. The control system as recited in claim 24, wherein said image processing system includes an undim counter, which is incremented each time a clear frame is processed.

29. The control system as recited in claim 28, wherein said undim counter is reset when a head lamp or tail lamp is detected in a frame.

30. The control system as recited in claim 14, wherein said image processing system includes means for computing the average output of a selected group of neighboring pixels in said image array sensor.

31. The control system as recited in claim 1, wherein said control signal is used to turn the high beam head lamps completely on or completely off.

32. The control system as recited in claim 1, wherein said control signal is used to continuously vary the brightness level of said high beam head lamps between completely on and completely off.

33. The control system as recited in claim 32, wherein said control signal is used to vary the duty cycle of said head lamps.

34. The control system, as recited in claim 1, wherein said optical system includes an image array sensor containing a plurality of pixels, and where the control signal is based on a pixel threshold value that varies as a function of the predetermined field of view imaged by said plurality of pixels.

35. The control system recited in claim 1, wherein said optical system includes an image array sensor containing a plurality of pixels, and where the image processing system is configured to respond to a lower output from pixels imaging the predetermined field of view directly in front of the controlled vehicle than from pixels imaging other regions of the predetermined field of view.

36. A control system for automatically controlling the state of the head lamps of a controlled vehicle, the control system comprising:
   an optical system for imaging external sources of light within a predetermined field of view, the optical system including an image array sensor and two or more lenses, each configured to image said predetermined field of view onto two or more corresponding portions of said array; and
   an image processing system for processing images from said optical system and providing a control signal for controlling the head lamps as a function of the relative output of the pixels imaging said external sources of light.

37. The control system as recited in claim 36, wherein said optical system is fixed relative to said controlled vehicle.

38. The control system as recited in claim 36, further including means for filtering the light through said predetermined lenses.

39. The control system as recited in claim 38, wherein said filtering means includes a filter dye for said one or more lenses.

40. The control system as recited in claim 36, having a first lens and a second lens.

41. The control system as recited in claim 40, wherein said first lens and said second lens are vertically offset from one another.

42. A control system for automatically controlling the state of the head lamps of a controlled vehicle, the control system comprising:
   an optical system for imaging external sources of light within a predetermined field of view; and
   an image processing system for processing images from said optical system for providing a control signal for controlling said head lamps, said image processing means including means for detecting nuisance light sources by detecting the AC intensity modulation of said nuisance light sources resulting from the alternating current source from which said nuisance light sources are powered.

43. The control system as recited in claim 42, wherein said nuisance light sources are street lights.

44. A control system for automatically controlling the high beam state of the head lamps of a controlled vehicle comprising:
   an optical system for imaging external sources of light within a predetermined field of view onto an image sensor containing a plurality of pixels, said optical system configured to selectively transmit one or more predetermined spectral bands of light, and said optical system configured to image light within each predetermined spectral band onto different predetermined blocks within said image sensor; and
   an image processing system for processing images from said optical system and providing a control signal for controlling the high beam state of the head lamps as a function of the output of one or more pixels within each of said predetermined blocks, relative to the output of other pixels within the same block.

45. The control system as recited in claim 44, wherein said image processing system provides a control signal for controlling the high beam state of the head lamps as a function of the output of pixels within one of said predetermined blocks relative to the output pixels within another one of said predetermined blocks and where each of said pixels within one block images substantially the same region of space as a corresponding pixel within the other block.

46. The control system recited in claim 45, wherein, the number of predetermined spectral bands is at least two, and the optical system contains a baffle to prevent light from one said spectral band from arriving on the block of pixels within the image array reserved for light within a second spectral band.

47. The control system recited in claim 45, wherein, the optical system contains a two or more lenses, each lens having an associated filter to transmit a predetermined spectral band of light and each lens configured to image said field of view onto different designated blocks of said image sensor.

48. The control system recited in claim 47, wherein, the optical system is configured to prevent light passing through one said lens from arriving onto the block of the image sensor designated for light imaged by another of said two or more lenses.

49. The control system as recited in claim 44, wherein said optical system contains a baffling means to prevent light from outside of said predetermined field of view from arriving on said image sensor.

50. A control system for automatically controlling the high beam state of the head lamps of a controlled vehicle comprising:

an optical system for imaging external sources of light within a predetermined field of view onto an image array sensor, said optical system configured to distinguish light sources which emit red light from those which emit white light, said optical system further configured to not image light in the infrared region of the spectrum emitted by said light sources, thereby increasing the distinction between said red-emitting sources and said white-emitting sources; and an image processing system for processing images from said optical system and providing a control signal for controlling the high beam state of the head lamps.

51. A control system for automatically controlling the high beam state of the head lamps of a controlled vehicle comprising:

an optical system for imaging external sources of light within a predetermined field of view;

a head lamp system wherein the brightness of the head lamps is variable; and an image processing system for processing images from said optical system and providing a control signal for controlling the brightness of the head lamps, said processing system configured to distinguish between external sources of light and reflections from the controlled vehicle's head lamps off of various external objects by comparing the relative brightness of imaged objects between two consecutive images where the brightness of said head lamps is varied between each image.

52. A control system for automatically controlling the high beam state of the head lamps of a controlled vehicle comprising:

a sensor for sensing external sources of light within a predetermined field of view; and a processing system providing a control signal for controlling said head lamps wherein said processing system is capable of distinguishing between oncoming vehicle head lamps and stationary light sources by detecting the intensity modulation in said stationary light sources which results from the alternating current power source from which said stationary light sources are powered.

53. The control system recited in claim 52, wherein, the sensor comprises an optical system for imaging external sources of light onto an image sensor containing a plurality of pixels, and wherein the processing system is an image processing system which identifies sources of light within the image, rapidly acquires multiple samples of the pixels in the portion of the image sensor sensing the image, and analyzes the acquired samples to detect an intensity modulation of the light source.

* * * * *

UNITED STATES PATENT AND TRADEMARK OFFICE
CERTIFICATE OF CORRECTION

PATENT NO. : 5,837,994 C1
DATED : October 16, 2001
INVENTOR(S) : Joseph S. Stam et al.

It is certified that error appears in the above-identified patent and that said Letters Patent is hereby corrected as shown below:

Column 2,
Line 55, delete "the" before "subjecting";

Column 3,
Line 2, "lights" should be -- light --;
Line 20, "substantially" should be -- same --;
Line 28, "the absorb" should be -- to absorb --;
Line 50, after "greater" insert -- than --;
Line 54, "between intensity" should be -- of intensity --;

Column 4,
Lines 5 and 6, "and a spherical lenses" should be -- and aspherical lenses --;
Line 42, "directions" should be -- direction --;

Column 5,
Line 4, "the integrate" should be -- to integrate --;
Line 49, after "to" insert -- be --;
Line 65, "ability the" should be -- ability to --;

Column 6,
Line 9, "amount the" should be -- amount of the --;

Column 7,
Line 25, before "317" delete "to";
Line 29, after "system" delete "exits";

Column 8,
Line 18, after "threshold" insert -- may be selected --;
Line 27, after "areas" delete "of";
Line 35, delete "by";

Column 9,
Line 50, "systems" should be -- system --;
Line 66, after "sensitive" insert -- and --;

UNITED STATES PATENT AND TRADEMARK OFFICE
CERTIFICATE OF CORRECTION

PATENT NO.    : 5,837,994 C1
DATED         : October 16, 2001
INVENTOR(S)   : Joseph S. Stam et al.

It is certified that error appears in the above-identified patent and that said Letters Patent is hereby corrected as shown below:

Column 10,
Line 35, after "utilize" insert -- a --;
Line 35, delete "that";
Line 43, "photodiode can used" should be -- photodiode can be used --.
Line 52, after "portion" insert -- of --; and Column 11,
Line 16, "a varying" should be -- vary --.

Signed and Sealed this

Third Day of December, 2002

JAMES E. ROGAN
*Director of the United States Patent and Trademark Office*

Adverse Decisions in Interference

Patent No. 5,837,994, Joseph Scott Stam, Jon Harold Bechtel, John King Roberts, CONTROL SYSTEM TO AUTOMATICALLY DIM VEHICLE HEAD LAMPS, Interference No. 105,325, final judgment adverse to the patentees rendered September 26, 2006, as to claims 36-40 and 44-49.

*(Official Gazette April 17, 2007)*

(12) REEXAMINATION CERTIFICATE (4461st)
United States Patent
Stam et al.

(10) Number: US 5,837,994 C1
(45) Certificate Issued: Oct. 16, 2001

(54) CONTROL SYSTEM TO AUTOMATICALLY DIM VEHICLE HEAD LAMPS

(75) Inventors: Joseph Scott Stam; Jon Harold Bechtel, both of Holland; John King Roberts, East Grand Rapids, all of MI (US)

(73) Assignee: Gentex Corporation, Zeeland, MI (US)

Reexamination Request:
No. 90/005,439, Jul. 30, 1999

Reexamination Certificate for:
Patent No.: 5,837,994
Issued: Nov. 17, 1998
Appl. No.: 08/831,232
Filed: Apr. 2, 1997

(51) Int. Cl.$^7$ ............ B60Q 1/115; B60Q 1/14; H05B 37/00
(52) U.S. Cl. ............ 250/208.1; 250/214 D; 250/214 AL; 315/82; 362/466; 362/507
(58) Field of Search ............ 250/208.1, 208.2, 250/205, 226, 214 D, 214 AL, 216; 362/464, 465, 466, 467, 507; 315/77, 82, 83

(56) References Cited

U.S. PATENT DOCUMENTS

| | | |
|---|---|---|
| 4,692,798 | 9/1987 | Seko . |
| 4,930,742 | 6/1990 | Schofield et al. . |
| 5,036,437 | 7/1991 | Macks . |
| 5,235,178 | 8/1993 | Hegyi . |
| 5,416,318 | 5/1995 | Hegyi . |
| 5,451,822 | 9/1995 | Bechtel et al. . |
| 5,471,515 | * 11/1995 | Fossum et al. . |
| 5,508,592 | 4/1996 | Lapatovich et al. . |
| 5,614,788 | 3/1997 | Mullins et al. . |
| 5,660,454 | 8/1997 | Mori et al. . |
| 5,666,028 | 9/1997 | Bechtel et al. . |
| 5,715,093 | 2/1998 | Schierbeek et al. . |
| 5,796,094 | 8/1998 | Schofield et al. . |
| 5,837,994 | 11/1998 | Stam et al. . |
| 5,942,853 | 8/1999 | Piscart . |
| 5,990,469 | 11/1999 | Bechtel et al. . |
| 6,097,023 | 8/2000 | Schofield et al. . |

FOREIGN PATENT DOCUMENTS

| | | |
|---|---|---|
| 29 46 561 A | 5/1981 | (DE) . |
| 2 641 237 A | 7/1990 | (FR) . |
| 2 726 144 A | 4/1996 | (FR) . |
| 8-166221 | 12/1994 | (JP) . |
| WO 86 05147 A | 9/1986 | (WO) . |
| 9843850 | 10/1998 | (WO) . |
| 9947396 | 9/1999 | (WO) . |
| 0022881 | 4/2000 | (WO) . |

OTHER PUBLICATIONS

Christopher M. Kormanyos, SAE Paper No. 980003, pp. 13–18.
Franz–Josef Kalze, SAE Paper No. 980005, pp. 23–26.
J.P. Löwenau et al., SAE Paper No. 980007, pp. 33–38. no date.
Tohru Shimizu et al., SAE Paper No. 980322, pp. 113–117. no date.
JP Patent Abstracts of Japan vol. 096, No. 010, Oct. 31, 1996 & JP 08 166221 A Jun. 25, 1996.
English translation of French Publ. 2 726 144.
English translation of French Publ. 2 641 237.
English translation of German No. 29 46 561 A.
English translation of Heisei 8–166221 (1996).

* cited by examiner

*Primary Examiner*—John R. Lee

(57) ABSTRACT

An automatic vehicle head lamp dimming system which includes an optical system and an imaging processing system. The optical system is configured to discriminate between head lamps and tail lamps and focus the light rays from the head lamps and tail lamps on different portions of a pixel sensor array. The optical system as well as the image processing system provides for relatively increased discrimination of head lamps and tail lamps of other vehicles and also enables the high beam head lamps of the control vehicle to be controlled as a function of the distance as well as horizontal angular position of other vehicles relative to the controlled vehicle.

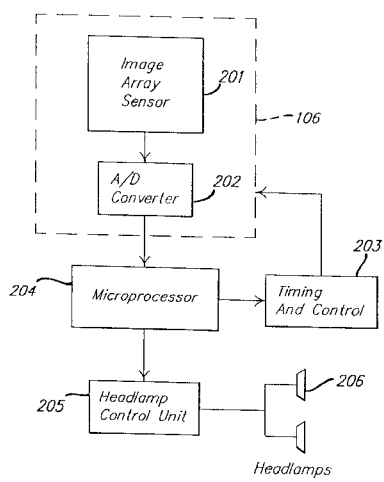

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 15–23:

Referring to FIGS. 2–4, the optical system includes a pair of lenses 103 and 104, a lens holder 105 and an image array sensor 106. As best shown in FIGS. 2 and 3, the lenses 103 and 104 are vertically spaced apart in order to allow imaging of substantially the same field of view onto different portions of the [substantially] *same* array. The lenses 103, 104 image generally the same fields of view because the distance between the lenses 103, 104 is relatively small relative to the light sources within the field of view of the device.

Column 3, lines 24–35:

The lens 103 may be formed with a red filter dye for transmitting light with wavelengths [less] *greater* than 600 nm and focusing red light rays 101 from tail lamps onto one half of the image array sensor 106. The red filter dye causes the lens 103 the absorb all light rays at the blue end of the visible spectrum and transmit light rays at the red end of the spectrum. As such, the amount of light transmitted from non-red light sources, such as head lamps, is greatly reduced while light rays from tail lamps are fully transmitted through the lens 103. As such, the relative brightness of the light rays from tail lamps imaged onto the image array sensor 106 is greatly increased.

Column 3, lines 36–46:

The lens 104 may be formed with a cyan filtered dye for transmitting light with wavelengths [greater] *less* than 600 nm. The lens 104 is used to focus the light rays onto the other half of the image array sensor 106. The cyan filter dye has a complementary effect to the red filter described above. In particular, the red filter dye absorbs light from the blue end of the visible spectrum while transmitting light from the red end of the spectrum. As such, most of the light from sources, such as head lights, are transmitted through the lens 104 while virtually all of the light emanating from tail lamps is blocked.

Column 4, lines 1–6:

The lenses 103 and 104 may be formed as acrylic spherical lenses. Alternatively, the lenses 103 and 104 may be formed as [a spherical] *aspherical* lenses in order to minimize color dispersion and spherical aberration present with spherical lenses. Complex lenses formed from both spherical and a spherical lenses are also contemplated.

Column 10, lines 20–48:

The primary nuisance light source complicating head lamp detection comes from overhead lights, such as street lights and electrically illuminated street signs. One method of eliminating such nuisance light sources is to analyze their motion. In particular, all overhead street lamps will move vertically upwards in the image as the controlled vehicle is moving. Analyzing this motion provides an efficient method of detecting some street lamps. Unfortunately, distant street lamps appear to be at almost the same elevational angles as distant head lights and the rate of vertical climb in the image does not become great until the street lamp is closer. However, as discussed above, street lighting is AC controlled and thus is subject to 120 Hz intensity modulation. Head lamps powered by DC source do not exhibit this characteristic. Thus, the image array sensor 106 is able to utilize small number of pixels [that] for taking several rapid consecutive readings in a window. If the window is small enough, the window can read several hundred frames per second. Once the light source is identified in the image, several frames are read out at a rate of 240 Hz or higher. These readings are then analyzed to detect the intensity modulation. If modulation is present, the light source originates from an AC source and can be ignored. Alternatively, a photodiode can used in conjunction with a low pass filter to determine the ratio of light in the image that was AC modulated to the unmodulated light. If a significant portion of the light source is AC modulated, the light source present in the image is assumed to be from AC light. Otherwise, the light source is assumed to be from a DC source.

Column 11, lines 7–21:

As discussed above, the system examines light sources as discussed above in steps 338 and 339 to determine if the light source is a street lamp. If the system determines that the light source is not a street lamp, the system proceeds to step 340 and sets a flag to cause dimming of the head lamps 206. If the system determines that the light source is a street lamp, the system proceeds to step 341 and moves on to the next pixel.

Traditional vehicle lamps systems have the option of the bright lamps being either on or off. The present invention is readily adaptable for use with a head lamp system where the brights can be activated to a varying the brightness based on the distance of other vehicles in the field of view. In such an embodiment, the brightness of the head lamps may be varied by various techniques including modulating the duty cycle of the head lamp in order to reduce or increase the overall brightness level.

AS A RESULT OF REEXAMINATION, IT HAS BEEN DETERMINED THAT:

The patentability of claims 42–43 and 50–53 is confirmed.

Claims 1, 7, 14, 15, 30, 36 and 44 are determined to be patentable as amended.

Claims 2–6, 8–13, 16–29, 31–35, 37–41 and 45–49, dependent on an amended claim, are determined to be patentable.

New claims 54 and 55 are added and determined to be patentable.

1. A control system for automatically controlling the state of the head lamps of a controlled vehicle, said control system comprising:
   an optical system for imaging external sources of light within a predetermined field of view, *said optical system including a pixel image array sensor*; and
   an image processing system for processing images from said optical system and providing a control signal for controlling the state of the head lamps as a function of the relative output of pixels imaging the same spectral band of light, *where said optical system is configured to image light sources emitting light within a predetermined spectral band onto at least one predetermined portion of said pixel image array sensor, where said predetermined portion includes a matrix of contiguous pixels.*

7. The control system as recited in claim [4] *1*, wherein said optical system is further configured to spatially segregate light *emitted from light* sources [having] *within* different predetermined spectral [compositions on] *bands onto different predetermined portions of* said pixel image array sensor.

14. [The] *A* control system [as recited in claim 1] *for automatically controlling the state of the head lamps of a controlled vehicle, said control system comprising:* an optical system for imaging external sources of light within a predetermined field of view, wherein said optical system includes two or more *non-coaxial* lenses and an image array sensor*; and* an image processing system for processing images from said optical system and providing a control signal for controlling the state of the head lamps as a function of the relative output of pixels imaging the same spectral band of light.

15. [The] *A* control system [as recited in claim 14, wherein said two or more lenses and said array sensor] *for automatically controlling the state of the head lamps of a controlled vehicle, said control system comprising:* an optical system for imaging external sources of light within a predetermined field of view, said optical system including a pixel image array sensor, wherein said optical system includes two or more lenses that are configured to image said predetermined field of view onto different portions of said image array sensor*; and* an image processing system for processing images from said optical system and providing a control signal for controlling the state of the head lamps as a function of the relative output of pixels imaging the same spectral band of light.

30. [The] *A* control system [as recited in claim 14] *for automatically controlling the state of the head lamps of a controlled vehicle, said control system comprising:* an optical system for imaging external sources of light within a predetermined field of view, said optical system including a pixel image array sensor; and an image processing system for processing images from said optical system and providing a control signal for controlling the state of the head lamps as a function of the relative output of pixels imaging the same spectral band of light, wherein said image processing system includes means for computing the average output of a selected group of neighboring pixels in said image array sensor.

36. A control system for automatically controlling the state of the head lamps of a controlled vehicle, the control system comprising:

an optical system for imaging external sources of light within a predetermined field of view, the optical system including an image array sensor and two or more lenses [, each] configured to image said predetermined field of view onto two or more corresponding portions of said array; and an image processing system for processing images from said optical system and providing a control signal for controlling the head lamps as a function of the relative output of the pixels imaging said external sources of light.

44. A control system for automatically controlling the high beam state of the head lamps of a controlled vehicle comprising:

an optical system for imaging external sources of light within a predetermined field of view onto an image sensor containing a plurality of pixels, said optical system configured to selectively transmit [one] *two* or more predetermined spectral bands of light, and said optical system configured to image light within each predetermined spectral band onto different predetermined blocks within said image sensor; and an image processing system for processing images from said optical system and providing a control signal for controlling the high beam state of the head lamps as a function of the output of one or more pixels within each of said predetermined blocks, relative to the output of other pixels within the same block.

*54. The control system as recited in claim 1, wherein said spectral band is a subset of the visible spectrum.*

*55. The control system as recited in claim 1, wherein said optical system images external light sources within a predetermined spectral band of light, and said spectral band is a subset of the spectrum to which said pixel image array sensor is sensitive.*

\* \* \* \* \*